June 3, 1941.   F. GENGENBACH   2,244,455
ELECTRIC CONTACT
Filed Sept. 21, 1939
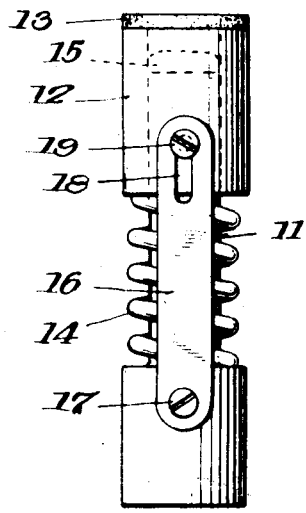
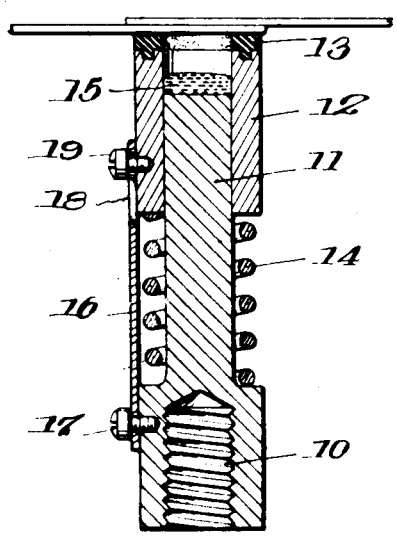
Inventor
Fritz Gengenbach
By Karl Irwin
his Attorney Patented June 3, 1941

2,244,455

UNITED STATES PATENT OFFICE 2,244,455

ELECTRIC CONTACT

Fritz Gengenbach, Attleboro, Mass., assignor of one-half to William J. Reilly, Attleboro, Mass.

Application September 21, 1939, Serial No. 295,977

8 Claims. (Cl. 219—4)

The invention relates particularly to electric contacts which are especially adapted for use in welding machines. Ordinarily spot welding machines employ rigid contacts or welding tips. One or both of these is pressed against material to be welded. If the material to be welded is irregular in form the contact made may be loose in part or irregular. This may produce a variation in the heat of the area affected and may discolor, deform or otherwise impair the material being operated on.

A purpose of the present invention is to procure accurate, full and complete contact. To this end one of the contact points may consist of a liquid contact member which may be brought into close and complete contact with the material to be operated upon. For this purpose it has been found convenient to employ mercury which is not only a liquid and forms a close, intimate contact with the material to be welded but is in itself a good conductor of electricity.

In the accompanying drawing one form of contact embodying the present invention is shown. Figure 1 is a side elevation of a contact. Fig. 2 is a transverse vertical section of the contact showing it associated with a second contact and with the material to be welded.

The contact may be associated with any form of welding machine. Suitable means such as threaded portion 10 may be provided for attaching it to the bottom arm of the machine. There is provided an upwardly extending tip 11 which may be of suitable conducting material such as copper. Surrounding the end of the tip 11 may be provided a sleeve or cylinder 12 of suitable material, preferably steel. The upper end of the cylinder which may be of any suitable cross section to cooperate with the tip 12 may be provided with a collar or washer 13 preferably made of suitable insulating material which may be partially resilient. Rubber, asbestos or the like are suitable materials for this purpose. A spring 14 shown as surrounding the tip 11 and resting against the top of the threaded portion 10 holds the sleeve or cylinder 12 normally so that it extends beyond the end of the tip 11, thus forming a pocket on top of the tip 11 into which may be placed a suitable quantity of a liquid 15 of conducting material such as mercury. A strap 16 fastened at 17 to the base of the tip 11 is provided with a slot 18 engaging a screw 19 in the sleeve 12, thus acting as a device for guiding and limiting the movement of the sleeve 12 up and down on the tip 11. The material to be welded may be placed on the insulating collar 13 on the end of the cylinder 12. As the top welding tip 20 comes down upon the work it causes the cylinder 12 to slide down on the tip 11 until the liquid 15 comes in contact with the work, thereby completing the circuit and welding the two pieces together. No matter what is the contour, shape or form of the material to be welded the liquid 15 will conform exactly to the contour of the article and form a substantially perfect contact and connection thus avoiding marring of the article which might be caused by uneven distribution of the contact and of the heat.

The invention may be embodied in other forms than that shown.

I claim as my invention:

1. A contact for welding comprising a contact member, a resiliently supported sleeve on the contact member, a resilient collar on the end of the sleeve and against which the work pushes to depress the sleeve, and mercury above the contact member within the sleeve and adapted to come into contact with the work when the sleeve is depressed.

2. A contact for welding comprising a contact member, a resiliently supported sleeve on the contact member, an insulating collar on the end of the sleeve and against which the work pushes to depress the sleeve, and mercury above the contact member within the sleeve and adapted to come into contact with the work when the sleeve is depressed.

3. A contact for welding comprising a contact member, a resiliently supported sleeve on the contact member against which the work pushes to depress the sleeve, and mercury above the contact member within the sleeve and adapted to come into contact with the work when the sleeve is depressed.

4. A contact for welding comprising a fixed contact member, a resiliently supported sleeve on the fixed member and against which the work pushes to depress the sleeve, and a liquid conductor above the contact member within the sleeve and adapted to come into contact with the work when the sleeve is depressed.

5. A contact for welding comprising a fixed contact member, a spring on the member, a sleeve supported by the spring on the fixed member and against which the work pushes to depress the sleeve, and a liquid conductor above the contact member within the sleeve and adapted to come into contact with the work when the sleeve is depressed.

6. A contact for welding comprising a resiliently supported sleeve, mercury within the sleeve and normally below the level of the top of the sleeve, and means for causing the work to be welded to contact with the mercury.

7. A contact for welding comprising mercury normally protected from contact with the work to be welded, and means to cause the work to make contact with the mercury to close the welding circuit.

8. A contact for welding comprising a resiliently supported sleeve, mercury within the sleeve and normally below the level of the end of the sleeve, and means to cause the work to be welded to depress the sleeve to cause the mercury to come into contact with the work.

FRITZ GENGENBACH.